Figure 1:
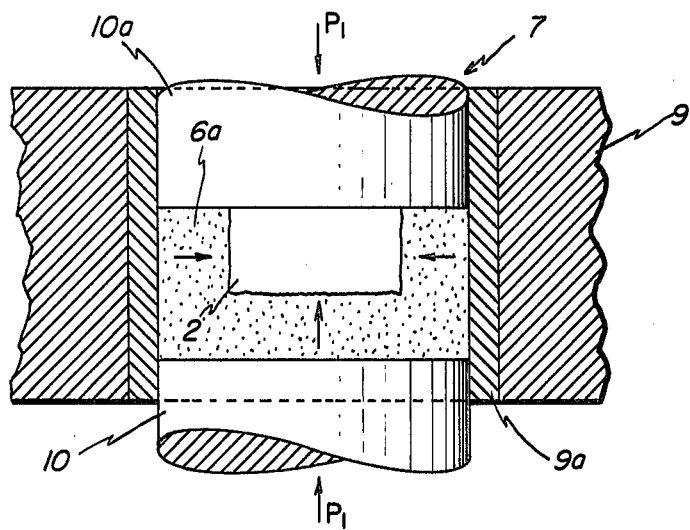

United States Patent [19]

Lee et al.

[11] 4,151,686

[45] May 1, 1979

[54] SILICON CARBIDE AND SILICON BONDED POLYCRYSTALLINE DIAMOND BODY AND METHOD OF MAKING IT

[75] Inventors: Minyoung Lee, Schenectady; Robert C. DeVries, Burnt Hills; Lawrence E. Szala, Scotia; Roy E. Tuft, Albany, all of N.Y.

[73] Assignee: General Electric Company, Schenectady, N.Y.

[21] Appl. No.: 867,938

[22] Filed: Jan. 9, 1978

[51] Int. Cl.² .......................... B24D 3/04; B24D 3/10
[52] U.S. Cl. ........................................ 51/307; 51/295; 264/332
[58] Field of Search .......................... 51/309, 295, 307; 264/332

[56] References Cited

U.S. PATENT DOCUMENTS

| | | | |
|---|---|---|---|
| 3,239,321 | 3/1966 | Blainey et al. | 51/307 |
| 3,574,580 | 4/1971 | Stromberg et al. | 51/309 |
| 3,617,347 | 11/1971 | Kuratomi | 51/307 |
| 3,912,500 | 10/1975 | Vereschagin | 51/309 |
| 3,913,280 | 10/1975 | Hall | 51/309 |

Primary Examiner—Donald J. Arnold
Attorney, Agent, or Firm—Jane M. Binkowski; Joseph T. Cohen; Charles T. Watts

[57] ABSTRACT

A mass of diamond crystals contacting a mass of elemental silicon are confined within a pressure-transmitting medium. The resulting charge assembly is subjected to a pressure of at least 25 kilobars causing application of isostatic pressure to the contacting masses which dimensionally stabilizes them and increases the density of the mass of diamond crystals. The resulting pressure-maintained charge assembly is heated to a temperature sufficient to melt the silicon and at which no significant graphitization of the diamond occurs whereby the silicon is infiltrated through the interstices between the diamond crystals producing, upon cooling, an adherently bonded integral body.

9 Claims, 5 Drawing Figures

U.S. Patent  May 1, 1979  Sheet 1 of 2  4,151,686

SILICON CARBIDE AND SILICON BONDED POLYCRYSTALLINE DIAMOND BODY AND METHOD OF MAKING IT

This invention relates to the production of a polycrystalline diamond body comprised of a dense mass of diamond crystals bonded together by a silicon atom-containing bonding medium. The present body is useful as an abrasive, cutting tool, nozzle or other wear-resistant part.

Briefly stated, the present process comprises confining a mass of diamond crystals in contact with a mass of elemental silicon within a pressure-transmitting medium producing a charge assembly of pressure-transmitting medium enveloped-diamond and silicon contacting masses, applying a pressure of at least about 25 kilobars to the charge assembly causing application of substantially isostatic pressure via the pressure-transmitting medium to the contacting masses dimensionally stabilizing them and compressing the mass of diamond crystals to a density higher than 80% by volume of the resulting compressed mass of diamond crystals, maintaining the applied pressure, heating the resulting pressure-maintained charge assembly to a temperature sufficient to melt the silicon and at which no significant graphitization of the diamond occurs whereby the silicon is infiltrated throughout the interstices or voids between the compressed mass of diamond crystals, said silicon being used in an amount sufficient to fill the interstices or voids of said compressed mass of diamond crystals, ceasing the input of heat into the resulting infiltrated mass of diamond crystals, removing said applied pressure, and recovering the resulting polycrystalline diamond body comprised of diamond crystals bonded together by a silicon-atom containing medium comprised of silicon carbide and silicon, said silicon carbide having been formed by reaction of silicon with the diamond and non-diamond elemental carbon which may have been produced from diamond, and wherein the diamond crystals are present in an amount of at least about 80% by volume of the total volume of said body.

In carrying out the present invention, a mass of diamond crystals in contact with a mass of silicon is confined within a pressure-transmitting medium which transmits applied pressure substantially or approximately isostatically to the confined masses therewithin. Initially, the pressure-transmitting medium is in the form of very fine particles, preferably −400 mesh, and more preferably ranging in size from about 2 microns to about 20 microns. The pressure-transmitting medium should not be significantly deleteriously affected by the required heating-under-pressure step, i.e. infiltration step, which would prevent the transmittance of substantially isostatic pressure to the masses confined therewithin. Specifically, during the infiltration step, the pressure-transmitting medium should not be converted to a stronger stiffer state, and it should be substantially inert to liquid silicon. Representative of such a pressure-transmitting medium is hexagonal boron nitride.

The contacting masses of diamond crystals and silicon can be disposed within the pressure-transmitting medium when it is in a powder form or in a pre-pressed form. The pressure-transmitting medium can be cold- or hot-pressed, for example, and it only need be pressed to give it sufficient mechanical strength for handling purposes. When the contacting masses of diamond crystals and silicon are disposed initially within a pressure-transmitting powder, preferably a cavity of predetermined size is first impressed in the powder, and the contacting masses are disposed within the cavity, which is then covered with additional powder. The resulting system of powder-enveloped masses is compressed to confine the contacting masses and to cold press the powder into a form with sufficient mechanical strength for handling purposes. In a pre-pressed form, the pressure-transmitting medium can have a number of configurations such as, for example, a hollow cylinder of predetermined size, open at both ends, and after the contacting masses of diamond crystals and silicon are positioned within the cylinder, it is plugged sufficiently at both ends with plugs of pressure-transmitting medium to confine the contacting masses therewithin. By confining the contacting masses of diamond crystals and silicon within a pressure-transmitting medium it is meant herein that no free space is left around the contacting masses which would allow a repositioning or substantial movement of the mass of diamond particles which would significantly change its configuration during subsequent application of pressure to dimensionally stabilize them.

Figure 2:
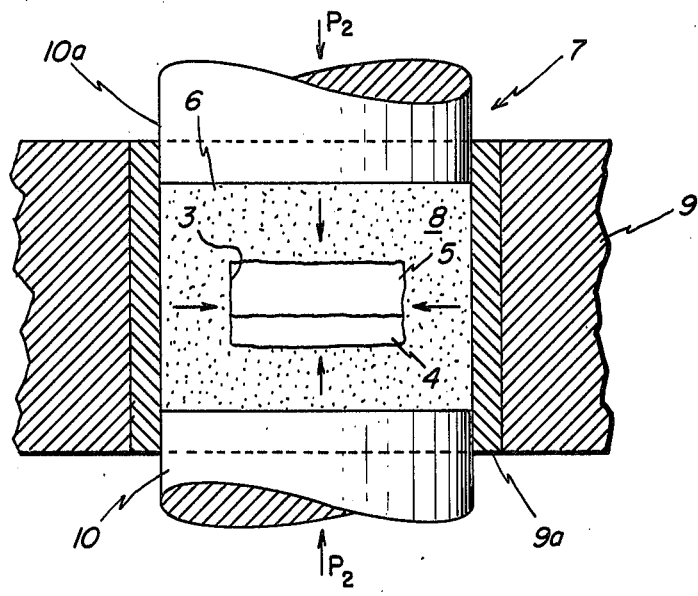
Figure 3:
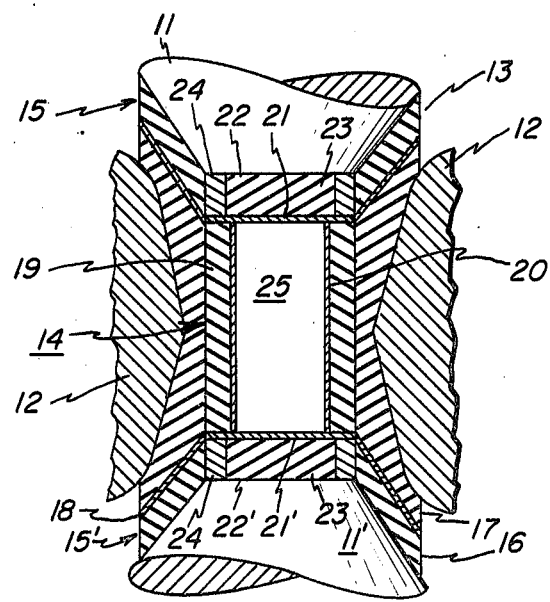
Figure 4:
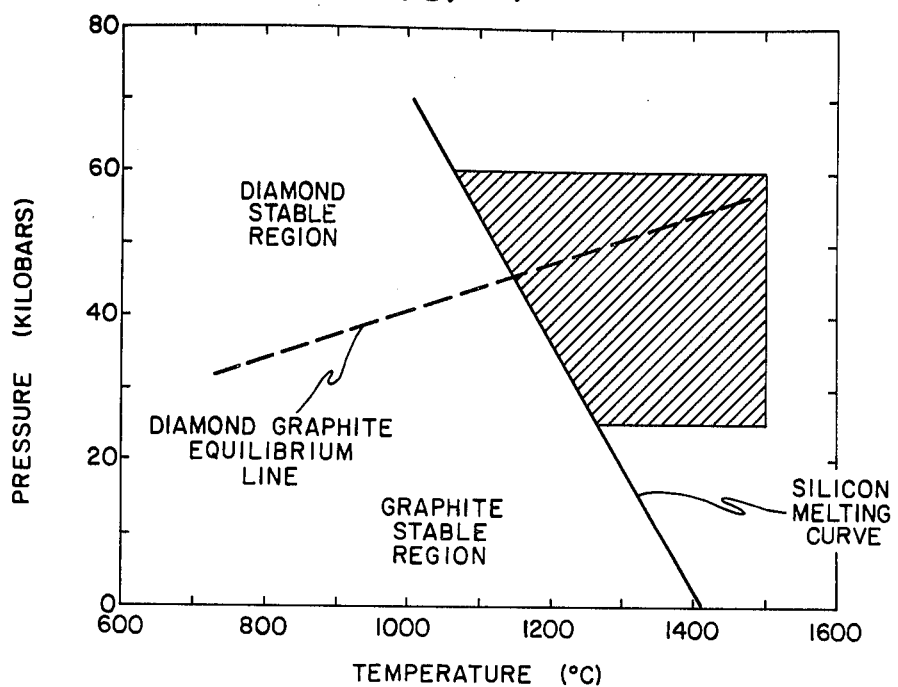
Figure 5:
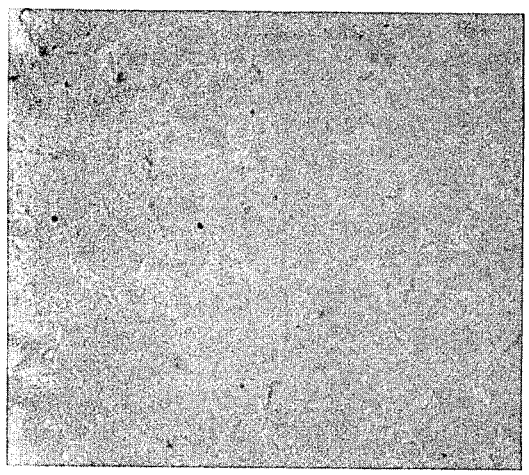

Those skilled in the art will gain a further and better understanding of the present invention from the detailed description set forth below considered in conjunction with the figures accompanying and forming a part of the specification in which:

FIG. 1 is a sectional view through an apparatus for forming a cavity in the pressure-transmitting powder medium;

FIG. 2 is a sectional view through the same apparatus as FIG. 1 showing confining a mass of diamond crystals in contact with a mass of silicon within the pressure-transmitting medium by compressing the pressure-transmitting powder around them and, also if desired, for applying significant or substantial isostatic pressure to the confined masses via the pressure-transmitting medium to significantly or substantially dimensionally stabilize them;

FIG. 3 illustrates one exemplary high pressure, high temperature apparatus useful in the preparation of the product of this invention;

FIG. 4 shows the melting curve of silicon as a function of pressure and the shaded area defines the operable combinations of pressure and temperature for carrying out the present process; and FIG. 5 is a photomicrograph (magnified 690 X) of a polished transverse section of a diamond body prepared by the present process wherein the diamond content was about 90% by volume of the body. The light greyish-white phase of FIG. 5 is bonding medium and the grey phase is diamond crystal. The dark spots are dirt.

In the arrangement shown in FIG. 1, a cavity of predetermined size is pressed into pressure-transmitting powder medium 6a by means of mold 2. Sufficient pressure, generally from about 10,000 psi to about 50,000 psi, need only be applied by piston 10a to make the powder 6a at least substantially stable in form so that when pressure is removed, i.e. piston 10a is withdrawn, the mold 2 can be removed leaving the cavity 3 it has depressed therein. The mold 2 can be of any smooth surfaced material such as, for example, stainless steel or cemented carbide, which can withstand the applied pressure and which can be withdrawn from the compacted powder to leave the cavity 3 it has impressed therein.

In FIG. 1 when mold 2 is withdrawn leaving cavity 3, there is disposed within the cavity, disc 4 of silicon and a mass of diamond crystals 5 in contact with the silicon. Additional pressure transmitting powder is then placed over the cavity enveloping contacting masses 4 and 5 with pressure-transmitting medium.

As shown in FIG. 2, the pressure-transmitting medium enveloping contacting masses 4 and 5 is then subjected, at room or ambient temperature, to an applied pressure by pistons 10 and 10a which only need be sufficient to confine the masses and press the powder into a form having sufficient mechanical strength for handling purposes resulting in charge assembly 8. Preferably, at this point, as a practical matter, sufficient pressure is applied by pistons 10 and 10a of FIG. 2 to produce a dimensionally stabilized substantially isostatic charge assembly 8. Pressure mold 7 (ring 9 and pistons 10, 10a) may be made of tool steel and, if desired, ring 9 may be supplied with a sintered carbide sleeve 9a as shown to permit the application of pressures as high as 200,000 psi for the pressing step shown in FIG. 2. Within the confines of piston 10, sleeve 9a and piston 10a, as shown in FIG. 2, pressure preferably in the range of from about 20,000 psi up to about 100,000 psi, and usually up to about 50,000 psi, is exerted on the pressure-transmitting medium by the pistons actuated in the conventional manner until the applied pressure becomes stabilized as is done in conventional powder packing technology.

The mass of diamond crystals and mass of silicon can be in a number of forms. For example, each mass can be in the form of a layer with one layer superimposed on the other. Alternatively, the silicon can be in the form of a tube, or cylinder with a core extending through it, and the diamond crystals can be packed within the core of the silicon cylinder to produce a polycrystalline diamond body in the form of a bar. In still another embodiment, silicon can be in the form of a bar which can be centrally positioned in the cavity and the encircling space between the silicon bar and the interior wall of the cavity packed with diamond crystals to produce a diamond body in the form of a hollow cylinder.

The diamond crystals used in the present invention can be natural or synthetic. They range in size in largest dimension from about 1 micron to about 1,000 microns, and the particular size or sizes used depends largely on the particular packing or density of diamond crystals desired and also on the particular use of the resulting body. For most abrasive applications, diamond crystals no greater than about 60 microns are preferred. Preferably, to maximize the packing of the diamond crystals, they should be size-graded to contain a range of sizes, i.e. small, medium and large-sized crystals. Preferably, the size-graded crystals range from about 1 micron to about 60 microns, and preferably within this size range, about 60% to about 80% by volume of the total mass of crystals are of the larger sized portion of the range, about 5% to about 10% by volume are of medium size with the balance constituting the small-sized crystals or particles.

Sizing of the diamond crystals is facilitated by the jet-milling of larger diamond crystals. Preferably, the diamond crystals are chemically cleaned to remove any oxides or other impurities from the surface thereof before use in the present process. This may be accomplished by heating the diamond crystals in hydrogen at about 900° C. for about one hour.

The charge assembly, i.e. pressure-transmitting medium enveloped-confined contacting masses of diamond crystals and silicon, is placed within a reaction chamber of a high temperature-high pressure apparatus of the type used for synthesizing diamond by application of high temperatures and pressures. One preferred form of a high pressure, high temperature apparatus in which the product of the instant invention may be prepared is disclosed in U.S. Pat. No. 2,941,248 - Hall (incorporated by reference) and is briefly illustrated in FIG. 3.

The apparatus includes a pair of cemented tungsten carbide punches 11 and 11' and an intermediate belt or die member 12 of the same material. Die member 12 includes an aperture 13 in which there is positioned a reaction vessel 14. Between punch 11 and die 12 and between punch 11' and die 12 there are included gasket-/insulating assemblies 15, 15', each comprising a pair of thermally insulating and electrically non-conducting pyrophyllite members 16 and 17 and an intermediate metallic gasket 18.

Reaction vessel 14 in one preferred form, includes a hollow salt cylinder 19. Cylinder 19 may be of other material which (a) is not converted during high pressure-high temperature operation to a stronger, stiffer state (as by phase transformation and/or compaction) and (b) is substantially free of volume discontinuities occurring under the application of high temperatures and pressures, as occurs, for example, with pyrophyllite and porous alumina.

Positioned concentrically within and adjacent cylinder 19 is a graphite electrical resistance heater tube 20. Electrically conductive metal end discs 21 and 21' are utilized at each end of cylinder 19 to provide electrical connection to graphite heater tube 20. Adjacent each disc 21, 21' is an end cap assembly 22 and 22' each of which comprises a pyrophyllite plug or disc 23 surrounded by an electrical conducting ring 24.

Operational techniques for applying both high pressures and high temperatures in this apparatus are well known to those skilled in the superpressure art. The foregoing description relates to merely one high pressure-high temperature apparatus. Various other apparatuses are capable of providing the required combination of pressure and temperature that may be employed within the scope of this invention.

Charge assembly 8, although not illustrated in proportion, fits within space 25, i.e. the reaction chamber, of the apparatus of FIG. 3. The charge assembly should form a close fit within the reaction chamber so that on application of pressure the confined masses will not be repositioned significantly, i.e. so that the shape or configuration of the confined masses will not be changed significantly. Any space between the charge assembly and reaction chamber should be filled with additional pressure-transmitting medium.

At room or ambient temperature, a pressure ranging from about 25 kilobars to about 60 kilobars is applied to the charge assembly within the reaction chamber. This applied pressure dimensionally stabilizes the charge assembly or additionally dimensionally stabilizes it, and compresses the mass of diamond crystals to a density higher than 80% by volume of the compressed mass. Specifically, the applied pressure diminishes the size of the voids to maximize the presence of capillary-size voids in the diamond mass, and this reduction in void volume provides more juxtaposed crystal-to-crystal areas properly located for effective bonding together. An applied pressure significantly below 25 kilobars will not compress the mass of diamond crystals to a diamond density higher than 80% by volume. The particular pressure to be applied is determinable largely by the diamond density desired and the size of the diamond crystals. For a mass of diamond crystals having a particular size or mixture of sizes, the pressure to be applied to attain a particular diamond density in the product is determinable empirically, i.e. the higher the applied pressure the higher the diamond density in the compressed mass of diamond crystals. Also, the higher the density of the crystals, the less will be the amount of non-diamond materials present between the crystals resulting in a proportionately harder abrasive body. However, an applied pressure higher than 60 kilobars provides no significant advantage. For best results, the applied pressure ranges from about 35 kilobars to about 55 kilobars.

The nature of the present pressure-transmitting medium is such that it results in an approximation of a hydrostatic action in response to uniaxially applied pressure to exert substantially isostatic pressure on the contacting masses 4 and 5 therewithin dimensionally stabilizing them substantially uniformly producing a substantially isostatic charge assembly of pressure-transmitting medium enveloped-contacting masses. It is assumed that the applied pressure is transmitted substantially undiminished to contacting masses 4 and 5.

The silicon is used in an amount sufficient to fill the voids or interstices of the compressed mass of diamond crystals having a diamond crystal density higher than 80% by volume of the compressed mass. Generally, the silicon can be used in an amount ranging from about 25% by volume to about 80% by volume, but preferably for best results it ranges from about 30% to about 60% by volume of the compressed mass.

The dimensionally stabilized charge assembly is maintained under the applied pressure of at least about 25 kilobars and heated to the infiltration temperature, i.e., a temperature at least sufficient to melt the silicon, and on melting, the liquid silicon is forced throughout the interstices or voids of the compressed mass of diamond crystals. The pressure-transmitting medium forces the liquid silicon to infiltrate throughout the compressed mass of diamond crystals and deters it from spurting into contact with the surrounding salt liner or graphite. Without the pressure-transmitting medium, the present process is not operable since the liquid silicon is highly mobile and reactive and preferentially spurts around the compressed diamond mass to react with surrounding materials.

In carrying out the infiltration, initially, when the silicon is melted, any slag or oxide which might form or be present therein floats therein and is left behind when the liquid silicon infiltrates through the compacted diamond mass. Also, the application of the pressure to the liquid silicon breaks up interfacial refractory layer or slag, largely oxide, which usually is present or which forms between the liquid silicon and diamond surfaces exposing the capillary void system to the silicon. As a result, the present diamond compact is free of glassy phase which would prevent a strong bond from forming between the diamond and the silicon-atom containing bonding medium.

At standard pressure the melting point of silicon has been given in the art to range from about 1412° C. to about 1430° C. However, under the applied superpressure of the present process, silicon melts at a temperature substantially below its given melting temperature at standard pressure as shown by the silicon melting curve in FIG. 4 which shows that under a pressure of 60 kilobars, silicon will melt at a temperature of about 1080° C., and under a pressure of 25 kilobars, silicon will melt at a temperature of about 1260° C. The shaded area in FIG. 4 defines the operable combinations of temperature and pressure for carrying out the present infiltration. As shown by the shaded area of FIG. 4, under a pressure of 35 kilobars, the infiltration temperature ranges from about 1160° C. to 1500° C. and under a pressure of 55 kilobars, the infiltration temperature ranges from about 1110° C. to about 1500° C. An infiltration temperature higher than about 1500° C. provides no significant advantage and is likely to produce contamination of the polycrystalline diamond body due to the high mobility and reactivity of the silicon at such high temperature. Infiltration temperatures ranging from about 1300° C. to about 1400° C. are preferred since they are not too difficult to attain, insure rapid and complete liquification of the silicon and produce a less viscous silicon which penetrates more rapidly through the interstices or voids of the compressed mass of diamond crystals.

After the reaction vessel is assembled and introduced into the high pressure-high temperature apparatus within the gasket/insulation assemblies, the pressure is raised first and then the temperature. The infiltration temperature should be reached quickly, preferably in less than 5 minutes, to minimize conversion of diamond to non-diamond elemental carbon, and held at such temperature under the applied pressure usually for at least about two minutes to insure satisfactory infiltration throughout the diamond crystal mass. Generally, an infiltration time period ranging from about 2 minutes to about 10 minutes is satisfactory.

In the present process the conversion of diamond to a non-diamond form, i.e. silicon carbide, non-diamond elemental carbon or both, depends largely on time and temperature, i.e. the higher the temperature and the longer the time at such temperature the more likely the conversion of diamond to non-diamond form, and the extent of such conversion is determinable empirically. Specifically, above the diamond graphite equilibrium line in the shaded area of FIG. 4, the conversion of diamond proceeds largely by the reaction of silicon with the diamond surfaces to form silicon carbide and in such instance the present process should be completed before sufficient diamond has converted to non-diamond form which would decrease the diamond content of the recovered polycrystalline diamond body to less than 80% by volume of the body. On the other hand below the diamond graphite equilibrium line in the shaded area of FIG. 4, the conversion of diamond to non-diamond form is likely to proceed largely by the conversion of diamond to non-diamond elemental carbon, i.e., graphite, and again, in such instance the present process should be completed before sufficient diamond has converted to non-diamond form which would decrease the diamond content of the recovered polycrystalline diamond body to less than 80% by volume of the body.

During infiltration, as the liquid silicon infiltrates and flows through the diamond mass, it encapsulates the surfaces of the compressed diamond crystals reactng with the diamond surfaces or any non-diamond elemental carbon phase which may form, to produce silicon carbide at least at the surfaces of the diamond crystals resulting in an integral strongly-bonded diamond body.

It is during this infiltration step that it is particularly important that substantially isostatic conditions be maintained so that the liquid silicon will not be able to escape to any significant extent, but will be forced to move through the compressed mass of diamond crystals. The portion of the pressure-transmitting medium in contact with the liquid silicon preferably should not contain interconnecting pores larger than about 5 microns to prevent excessive leakage of liquid silicon.

When the infiltration is completed, heat input to the reaction chamber is ceased before the pressure is removed to prevent graphitization of the diamond and to preserve the dimensional stability of the infiltrated diamond mass. Specifically, when infiltration is completed, the electrical power to the graphite heater is shut-off and the reaction chamber cools to about room temperature quickly, usually in about 1 minute. Generally, when the reaction chamber has cooled to below 50° C., the pressure is then released, preferably at a rate of about 10 kilobars per minute to atmospheric pressure. Preferably, the infiltrated diamond mass is allowed to cool to room temperature before it is recovered. Any squeezed out excess silicon at the outside surfaces of the polycrystalline diamond body can be removed by conventional techniques such as grinding.

The present polycrystalline diamond body is comprised of a mass of diamond crystals adherently bonded to each other by a silicon atom-containing bonding medium consisting essentially of silicon carbide and elemental silicon, said diamond crystals ranging in size from about 1 micron to about 1000 microns, the density of said diamond crystals ranging from about 80% by volume up to about 95% by volume of said body, and usually from about 80% by volume to about 90% by volume of said body, said silicon atom-containing bonding medium being present in an amount ranging up to about 20% by volume of said body, said bonding medium being distributed at least substantially uniformly throughout the polycrystalline diamond body, the portion or surface of said bonding medium in contact with the surface of the bonded diamonds being at least in substantial amount silicon carbide, i.e. at least about 85% by volume and preferably 100% by volume of the portion or surface of the bonding medium in direct contact with the surfaces of the diamond crystals is silicon carbide. The present diamond body is pore free or at least substantially pore free.

The amount of silicon carbide and silicon in the bonding medium of the present diamond body can vary depending on the extent of the reaction between the surfaces of the diamond crystals and the infiltrating silicon as well as the reaction between non-diamond elemental carbon phase and infiltrating silicon. Assuming all other factors are equal, the particular amount of silicon carbide and elemental silicon present in the bonding medium depends largely on the particular combination of applied pressure and temperature used and the time period at such pressure-temperature combination. The production of the present body of bonded diamond crystals with a particular desired amount of silicon carbide to attain certain desirable properties, for example, is determinable empirically. Specifically, the bonding medium can range in composition from a detectable amount of silicon carbide to a detectable amount of elemental silicon, and by a detectable amount of silicon carbide or elemental silicon it is meant herein an amount detectable by selective area diffraction analysis of transmission electron microscopy on a thin section of the present body. Generally, however, the present bonding medium consists essentially of silicon carbide in an amount ranging from about 2% by volume to about 18% by volume of the present polycrystalline diamond body and elemental silicon in an amount ranging from about 18% to about 2% by volume of the body.

Selective area diffraction analysis of transmission electron microscopy on a thin section of the present polycrystalline diamond body also will show that the portion of the bonding medium in contact with the surfaces of the bonded diamonds being at least in substantial amount silicon carbide.

The present body of bonded diamond crystals is void or pore free or at least substantially pore free, i.e. it may contain voids or pores in an amount less than 1% by volume of the body providing such voids or pores are small, less than 0.5 micron, and sufficiently uniformly distributed throughout the body so that they have no significant deteriorating effect on its mechanical properties. The void or pore content of the present body is determinable by standard metallographic techniques such as, for example, by optically examining a polished cross-section of the body.

The present polycrystalline diamond body usually is free of elemental non-diamond carbon phase. However, it may contain non-diamond elemental carbon phase in an amount ranging up to about 1% by volume of the body provided such non-diamond elemental carbon phase is sufficiently distributed throughout the body so as not to have any significant deleterious effect on its mechanical properties. The presence of the elemental non-diamond carbon phase is detectable by standard metallographic techniques such as, for example, by optically examining a polished cross-section of the body, or by transmission electron microscopy on a thin section of the body. An amount of elemental non-diamond carbon phase significantly in excess of about 1% by volume is likely to have a significantly deleterious effect on its mechanical properties.

The present polycrystalline diamond body can be produced in a range of sizes and shapes. However, the present polycrystalline diamond body always will be in excess of a monolayer of diamond crystals.

A portion of the present diamond body can be soldered, brazed or otherwise adhered to a suitable support material such as sintered or hot-pressed silicon carbide, sintered or hot-pressed silicon nitride, or a cemented carbide, or a metal such as molybdenum forming a tool insert which, for example, can be held by a tool shank adapted to be held in a machine tool whereby the exposed surface of the diamond body can be used for direct machining. Alternatively, the present diamond crystal body can be mechanically clamped to a lathe tool for direct machining by the exposed surface of the diamond body.

The invention is further illustrated by the following examples:

EXAMPLE 1

The apparatus used in this example was substantially the same as that shown in FIGS. 1, 2 and 3.

Hexagonal boron nitride powder ranging in size from about 3 microns to about 20 microns was packed into a cylindrical steel die with a 0.46 inch internal diameter, and a cylinder used as a mold was pressed into the powder as shown in FIG. 1 by 6a and 2.

The cylinder was made of cemented metal carbide and was about 0.35 inch in diameter and 0.25 inch in thickness. The axis of the cylinder was approximately lined up with the central axis of the die.

In this embodiment, unlike FIG. 1, after the cylinder was inserted in the powder, additional hexagonal boron nitride powder was placed in the die covering the cylinder completely, and the resulting powder-enveloped cylinder was pressed at room temperature under a pressure of about 50,000 psi. The top piston 10a was then withdrawn and the bottom piston 10 was used to push the resulting pressed powder-enveloped cylinder partially out of the die. The exposed portion of the pressed powder was removed leaving the cylinder partially exposed. The cylinder was then withdrawn leaving the cavity it had impressed therein.

A cast commercially pure silicon disc of about 90 milligrams having a diameter almost the same as the inner diameter of the cavity was placed in the bottom of the cavity. About 240 milligrams of size-graded diamond powder, ranging in particle size from about 1 micron to about 50 microns with at least 25 weight % of the particles having a size smaller than 8 microns, was packed on top of the silicon disc.

A disc of hot-pressed hexagonal boron nitride powder of almost the same diameter as the inner diameter of the cavity was placed within the cavity on top of the diamond powder to insure that the surface of the resulting polycrystalline diamond body would be flat.

The entire mass was then pushed into the center of the die by the top piston which was then withdrawn. An additional amount of hexagonal boron nitride powder was added to the die to cover the hot-pressed disc of hexagonal boron nitride powder resulting in the cavity and contents being enveloped by hexagonal boron nitride. The resulting charge was then pressed at room temperature in the steel die under a pressure of about 50,000 psi as shown by FIG. 2 subjecting the cavity and its contents to substantially isostatic pressure confining the contacting masses therein, until the pressure became stabilized producing a dimensionally stabilized shaped substantially isostatic system. This pressed mass, i.e. charge assembly when it was pushed out of the steel die, had a diameter of about 0.46 inch and a thickness of 0.450 inch. The charge assembly was then inserted and centrally positioned in the reaction chamber, i.e. cavity of a reaction vessel of substantially the same type as shown by 14 of FIG. 3. The chamber had a diameter of about 0.46 inch and pressed salt cylinders were placed below and on top of the charge assembly to fill in the remaining space of the chamber. The reaction vessel was placed in a high pressure-high temperature apparatus substantially the same as that shown in FIG. 3 and at ambient temperature was pressed to about 55 kilobars. When the pressure became substantially stabilized, electric current was applied through the graphite heating element of the reaction vessel. The temperature of the reaction chamber reached about 1500° C. within approximately 2 to 3 minutes. The reaction chamber was kept at 1500° C. for 30 minutes, then the power was turned off. After the reaction vessel cooled to about room temperature, the pressure was released and the reaction vessel was removed from the apparatus.

The recovered polycrystalline diamond body was a well bonded disc of about 0.045 inch in thickness but the disc was cracked slightly, probably due to inadequate support by the hot-pressed boron nitride disc.

Using a hammer and wedge, the disc eas fractured substantially in half. Examination of the fractured cross-sectional surfaces of the disc showed that the fracture was transgranular rather than intergranular, i.e., it had fractured through the diamond grains rather than along the grain boundaries. This indicates that the bonding medium was highly adherent and was as strong as the diamond grains or crystals themselves.

A cross-sectional fractured surface of the disc was polished on a cast iron scaife. Optical examination of the polished cross-section of the disc showed a well-bonded microstructure which was substantially pore free and which also was free of non-diamond elemental carbon phase. The examination of the polished surface also showed no strings of holes formed from diamond fragment pullout illustrating strong bonding therein and its usefulness as an abrasive. The polished cross-section is shown in FIG. 5.

The diamond density was determined to be about 90% by volume of the disc. Diamond density was determined by the standard point count technique using a photomicrograph of the polished cross-sectional surface magnified 690 times and the surface area analyzed was sufficiently large to represent the microstructure of the entire body.

A portion of the disc was crushed and the powder was analyzed for its crystalline structure by X-ray diffraction technique which showed it to be comprised of diamond in substantial amount with silicon carbide and trace of silicon, indicating that the silicon carbide and elemental silicon were present in an amount of at least 2% by volume of the body. However, the X-ray diffraction analysis of the crushed body did not detect elemental non-diamond carbon phase.

Another portion of the disc was subject to a jet of silicon carbide particles to evaluate its abrasion resistance. The particle size of the silicon carbide was about 50μ and the pressure of particle carrying gas was about 80 psi. The rate of feed of silicon carbide particles was substantially high. The estimated eroded volume of the disc after two minutes of jet impingement was $0.03 \times 10^{-3}$ cm$^3$. Under identical test, for a comparison, a hot-pressed silicon carbide (96% dense) showed $0.16 \times 10^{-3}$ cm$^3$ of eroded crater and a cemented tungsten carbide with 6 w/o cobalt binder showed $0.15 \times 10^{-3}$ cm$^3$ of eroded crater. These tests show that the present polycrystalline diamond body has a significantly high wear resistance which makes it useful as an abrasive.

EXAMPLE 2

This example was carried out in the same manner as disclosed in Example 1 except that the reaction chamber was heated within approximately 2 minutes to a temperature of 1160° C., and it was maintained at 1160° C. for 5 minutes.

The recovered polycrystalline diamond body was a well-bonded disc which looked like the disc disclosed in Example 1.

Examination of its fractured cross-sectional surface showed that the fracture was transgranular rather than intergranular.

Optical examination of a polished cross-section of the disc showed a well-bonded microstructure which was substantially pore free and which was also free of non-diamond elemental carbon phase. The examination of the polished surface also showed no strings of holes formed from diamond fragment pullout.

The diamond density was determined in the same manner as disclosed in Example 1 and was found to be about 90% by volume of the disc.

A portion of the disc was crushed and analysis by X-ray diffraction technique showed it to be comprised of diamond, silicon carbide and a trace of silicon.

Another portion of the disc was subjected to a jet of silicon carbide particles to evaluate its abrasion resistance in the same manner as disclosed in Example 1 and was found to have the same wear resistance as the disc in Example 1.

What is claimed is:

1. A process for preparing a polycrystalline diamond body which comprises confining a mass of diamond crystals in contact with a mass of elemental silicon within a pressure-transmitting medium producing a charge assembly of pressure-transmitting medium enveloped-diamond and silicon contacting masses, said pressure-transmitting medium transmitting applied pressure substantially isostatically to the confined masses therewithin, applying a pressure of at least about 25 kilobars to said charge assembly causing application of substantially isostatic pressure via the pressure-transmitting medium to said contacting masses dimensionally stabilizing them and compressing the mass of diamond crystals to a density higher than 80% by volume of the resulting compressed mass of diamond crystals, maintaining said applied pressure, heating the pressure-maintained charge assembly to an infiltration temperature sufficient to melt the silicon and at which no significant graphitization of the diamond occurs whereby the resulting liquid silicon is infiltrated throughout the interstices between said compressed mass of diamond crystals, said pressure-transmitting medium being substantially inert to liquid silicon and forcing the liquid silicon to infiltrate through said compressed mass of diamond crystals, said silicon being used in an amount sufficient to fill the interstices of said compressed mass of diamond crystals, ceasing the input of heat into the resulting infiltrated diamond mass, removing said pressure and recovering the resulting polycrystalline diamond body comprised of diamond crystals bonded together by a silicon-atom containing medium comprised of silicon carbide and silicon, said silicon carbide having been formed by reaction of silicon with the diamond and non-diamond elemental carbon which may have been produced from diamond, and wherein the diamond crystals are present in an amount of at least 80% by volume of the total volume of said body.

2. The process according to claim 1 wherein said infiltration temperature ranges from about 1300° C. to about 1400° C.

3. The process according to claim 1 wherein said applied pressure ranges from 35 kilobars to 55 kilobars.

4. The process of claim 1 wherein said diamond crystals are size-graded ranging from about 1 micron to about 60 microns.

5. A polycrystalline diamond body comprised of a mass of diamond crystals adherently bonded together by a silicon atom-containing bonding medium comprised of silicon carbide and elemental silicon, said diamond crystals ranging in size from about 1 micron to about 1000 microns, the density of said diamond crystals ranging from about 80% by volume to about 95% by volume of said body, said silicon atom-containing bonding medium being present in an amount ranging up to about 20% by volume of said body, said bonding medium being distributed at least substantially uniformly throughout said body, the portion of said bonding medium in contact with the surfaces of said diamonds being at least substantially silicon carbide, said diamond body being at least substantially pore free.

6. The polycrystalline diamond body according to claim 5 wherein the density of said diamond crystals ranges from about 80% to about 90% by volume of said body.

7. The polycrystalline diamond body according to claim 5 wherein said crystals are size-graded ranging from 1 micron to about 60 microns.

8. The polycrystalline diamond body according to claim 5 wherein silicon carbide is present in an amount ranging from about 2% by volume to about 18% by volume of said body.

9. The process according to claim 1 wherein said pressure-transmitting medium is hexagonal boron nitride.

* * * * *